April 13, 1965 G. H. SINCLAIR 3,178,147
SUSPENSION EYELET DEVICE
Filed Dec. 20, 1963

INVENTOR.
GEORGE H. SINCLAIR
BY
*Gravely, Liedon & Woodruff*
ATTORNEYS

United States Patent Office 3,178,147
Patented Apr. 13, 1965

3,178,147
SUSPENSION EYELET DEVICE
George H. Sinclair, Richmond Heights, Mo., assignor to Sinclair & Rush, Inc., St. Louis, Mo., a corporation of Missouri
Filed Dec. 20, 1963, Ser. No. 332,173
4 Claims. (Cl. 248—359)

This invention relates to improvements in molded suspension eyelet devices and to the mold therefor.

The art has disclosed many types and constructions, of means to hand objects, such as rakes, brooms, mops, tools, and other objects. The prior art means have deficiencies in that rigid plastic or metal bodies are difficult to secure satisfactorily, or quickly, securely and economically. Rigid eyelet means cannot adapt to objects which have a wide range of dimensional variations. Eyelet hangers made of flexible rubber and other flexible materials lack chemical stability and age rapidly, to say nothing of the lack of tensile strength and a restricted range of dimensional tolerances. In some instances, the eyelet means crack, split, are easily stained, and tend to mar surfaces engaged thereby.

It has been found that the current eyelet means require expensive production equipment, run into costly operations of molds having cam controls, and result in too high price structure to be successful.

In view of the foregoing and other factors, it will appear that the suspension eyelet hereof overcomes the difficulties in the prior art, and has applications for domestic and commercial utility products. The functional and cost problems heretofore present are largely overcome by simple molding of an improved eyelet and with a unique mold.

It is an object of this invention to provide an improved eyelet which is strong, durable and inexpensive. It is also an object of this invention to provide an improved eyelet which may be produced in large volume with mass production methods as a one-piece product utilizing non-technical procedures.

It is another object to provide a simple molded, one-piece, eyelet from vinyl plastisol or other elastomeric materials having high tensile strength, resistance to abrasion, impact, chemical exposure and weathering, and which has elasticity without sacrifice to cohesive strength.

Another object of this invention is to provide an eyelet having a high degree of electrical resistance, a lustrous, soft feel with brilliant and unlimited colorability for easy recognition through color coding.

It is a further object of this invention to manufacture an eyelet having the foregoing charactersitics by mass production methods in which the mold plays an important part in the configuration of the eyelet to achieve the results sought.

A still further object of this invention is to provide a mold of improved form having important dimensional characteristics which contribute to the mass production of eyelets and permit the attainment of an eyelet which will fit objects having a wide range of dimensional variations.

Another object of this invention is to provide a mold having a form and shape which will improve the production rates of dip molded eyelets and permit rapid mold stripping operations without harm to the eyelets.

These and other objects and advantages of the present improvement in eyelets and molds for producing eyelets will be more precisely disclosed in connection with a presently preferred embodiment of the eyelet and of the mold, the same being described in more detail in view of the accompanying drawings, wherein.

Figure 1:
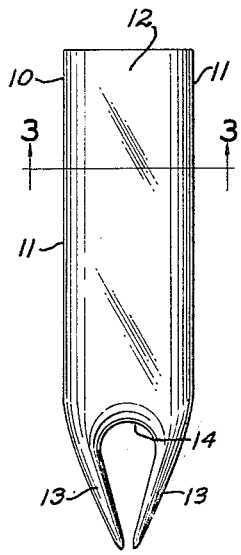
FIG. 1 is a side elevational view of a mold useful in producing the improved eyelets of this invention.
Figure 2:
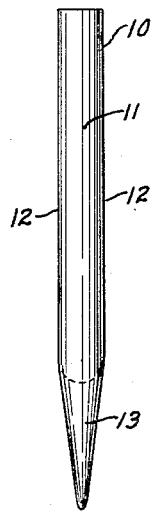
FIG. 2 is an edge view of the mold shown in FIG. 1.
Figure 3:
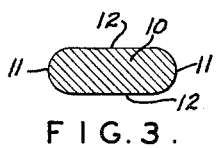
FIG. 3 is a sectional view of the mold taken at line 3—3 in FIG. 1.

In FIGS. 1, 2 and 3, it may be seen that the mold 10 is generally rectangular in form, in that it is wider than thick, rather than round or square. The edges 11 are given a circular radius form while the sides 12 are flat. One end of the mold 10 is formed with spaced fingers 13 projecting outwardly from a base-arch surface 14. It is, of course, understood that the mold 10 may be larger or smaller than that which is shown in FIG. 1 to provide for a range of eyelet sizes. In the case of the mold 10 illustrated, it is noted that the thickness from side 12 to side 12 may be varied, the critical thickness (or thinness) being that which will permit the necessary bleeding of air from the area of the base-arch 14 during molding.

Figure 5:
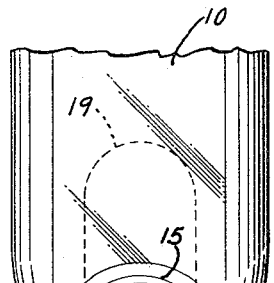
FIG. 5 is a greatly enlarged fragmentary side view of the eyelet forming fingers of the mold.
Figure 6:
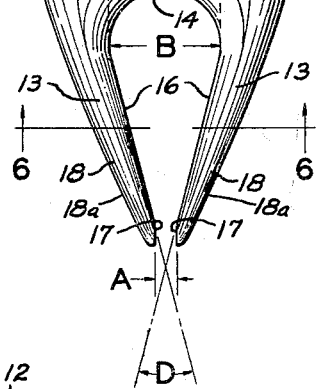
FIG. 6 is a sectional view taken at line 6—6 in FIG. 5.

In order to bleed air from the area of base-arch 14 the mold is beveled or given a radius 15 as shown in the enlarged view of FIGS. 5 and 6, while the base-arch 14 has a circular shape along the inner margin of the base-arch which extends between the fingers 13 such that the dimension B becomes a chord of the circle constituting the base-arch form. For ease of making the mold 10, the chord dimension B may be the diameter of the circle for the base-arch 14.

The edge of the circular base-arch 14 merges into the inner edges 16 of the respective fingers 13, and these edges 16 extend in substantially straight convergent lines toward the free ends of the fingers 13 and terminate at the gap A between such fingers. Thus, the edges 16 of the fingers 13 form the sides of a triangular eye in the mold 10, the base of the triangular eye being the circular or curved base-arch 14. In forming the gap A, the inner edges 17 are parallel and of a length substantially equal to the width dimension in the gap. The inner edges 16 for the fingers 13 converge toward the gap A and form an included angle D, which angle may vary from approximately 30 degrees to 45 degrees. The length of the inner edge 16 for each finger 13 shall preferably be approximately twice the dimension of the chordal dimension B, and each finger 13 is tapered toward the free end with the outer surface 18 circular in section (FIG. 6) and the surface of edge 16 shaped to a circular section of greater radius so as to be less sharply curved than the outer surface 18. It is preferred that the outer surfaces 18 have a slight ridge 18a.

In forming a mold having the structural characteristics above described it is important to maintain certain dimensions and shapes, as follows:

(1) The general cross-section of the mold (FIG. 3) shall be rectangular, that is wider than thick so that improved production rates can be attained by being able to mount many more molds in the usual carrier frame (not necessary to show).

(2) The gap A between the free ends of fingers 13 should not exceed a dimension that is approximately twice that of the wall thickness of the eyelet formed thereon so that the material will solidly bridge between the fingers.

(3) The gap A should not be smaller in dimension than approximately 80 percent of twice the wall thickness of the eyelet formed thereon in order to avoid undue stress and strain within the eyelet material and the side portions thereon.

(4) The adjacent surfaces 17 of the mold fingers 13 at the gap A should be parallel for a length substantially equal to the width of gap A so that the area of solidification of the eyelet material can be increased in molding, due to the increased surface area of the mold and the increased transmission of heat of gellation from the flat surfaces of the heated mold. In the finished product this affords an effective strengthening of the closed apex of the eyelet which is the point or area of applied stress when supporting a weight in suspension.

(5) The angle D shall not be less than approximately 30 degrees to avoid webbing of the eyelet material across the aperture of the eyelet, and to avoid congestion or choking in the gap A while stripping the eyelet from the mold the angle D should not exceed approximately 45 degrees.

(6) The inner surfaces 16 of the mold fingers which govern the angle D should be straight between the junction at chord B and the gap A so that stripping the eyelet can be achieved quickly to obtain a high production rate.

(7) The interior area between the mold fingers 13 and the base-arch 14 shall be triangular in general form, with the length of the edges 16 of the fingers 13 approximately twice the dimension of the chord B, so that the opening in the eyelet can be maintained.

(8) The surface of the mold above the chord B should be arcuate, and the sides 15 should be rounded (or beveled) to avoid entrapping air during the insertion of the mold into the material from which the eyelet is formed.

(9) The cross-section of each finger 13 should have a modified triangulation, as by combining the flat arc for surface 16 with the sharper arc for surface 18, and surface 18 is given a slight ridge 18a, so that strength and resistance to deformation of the sides of the eyelet opening can be achieved.

(10) The fingers 13 should be tapered toward the gap A to control the build-up of material in the eyelet opening at the gap A and to control the drain off of residual material by avoiding rapid gelling before drain off is completed and avoiding drip points on the finished eyelet.

In view of FIG. 5, the dotted outline 19 shows that the base-arch 14 may be variably spaced from the gap A to increase the length of the eye opening in finished eyelets. When locating the base-arch 14 at the position of the dotted outline 19, it is important to maintain the chord B dimension constant so that the sides of the opening above the converging finger edges 16 shall be parallel.

Figure 4:
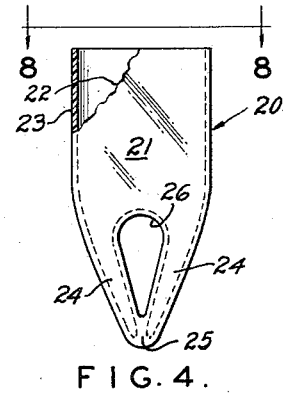
FIG. 4 is an eyelet made on a mold of the character shown in FIG. 1, the same being shown partly in broken section.

In FIG. 4 there is illustrated an eyelet 20 formed by means of the mold 10. The eyelet 20 is hollow in its principal body portion or skirt 21 as illustrated by the broken section 22 to show the wall 23. The skirt 21 has the integral side portions 24 which are also hollow, and the portions 24 are connected by a solid closed tip 25 which is formed by the material bridging over at the gap A of the forming mold 10. The shape and dimensional configuration of the eyelet 20 is substantially a duplicate of the mold 10, both internally and externally.

In forming an eyelet 20, the mold 10 is preheated to the desired temperature before being dipped into a container of vinyl plastisol or other elastomeric material. The time of immersion, the temperature of the material and the mold, and other factors are not material to the improvements herein disclosed, but may be of any of the usual and accepted factors for plastic molding processes. The mold 10 is withdrawn from the material at a uniform rate to assist the tapered fingers 13 in run-off control and to avoid drip points. The material remains on the form until it is fully cured, yet is sufficiently flexible on being stripped from the mold that the closed bridge portion 25 can slip through the gap A of the fingers 13 and the eye wall 26 can compress to pass through the gap A.

Figure 8:
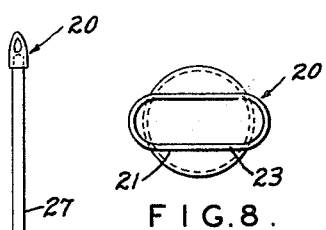
FIG. 8 is an end view of the eyelet taken at line 8—8 in FIG. 4.
Figure 7:
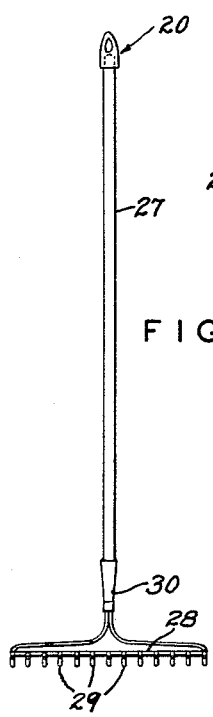
FIG. 7 is a view of an eyelet applied to the handle of a rake to illustrate an application of the eyelet of this invention.

Of course, the eyelet 20 has many uses for hanging tools and the like, one such use being illustrated in FIG. 7. The eyelet 20 is pushed over the end of handle 27 of a rake so that the rake head 28 with its rake fingers 29 can be suspended, the head being attached by the usual ferrule 30 to the handle 27. The eyelet skirt 21 being flattened to the shape of the mold 10 (see FIGS. 1, 2 and 3) it must be squeezed to a round shape to conform to the usual rake handle. In changing shape, the skirt 21 develops a high degree of frictional engagement and is difficult to pull off the handle. The view of FIG. 8 illustrates the relaxed shape of the eyelet 20 (in full line) which is the shape the skirt 21 tends to maintain after curing. Thus, when the skirt 21 is deformed to the shape (in broken line) of the round handle 27 the wall 23 wants to return to the relaxed shape and consequently grips the handle securely. The eyelet material is elastic and can be stretched to increase its grip by being made slightly smaller than the handle 27.

Modifications and variations may be made in details of the invention as hereinabove disclosed without departing from the scope of the invention defined in and by the appended claims.

What is claimed is:

1. An article suspension device comprising a one-piece molded body having a flexible wall skirt open at one end, the opposite end of said body being formed by hollow spaced arms having outer ends joined together to close the space between the arms and form an eyelet opening, said arms being tapered between said outer ends and said skirt wall, and said body skirt being flattened in a plane including both of said arms, whereby the application of said device to a non-flattened article requires the skirt to be deformed from the flattened form to conform to the article.

2. An article suspension device comprising a unitary body formed of a moldable elastomeric material having a skirt portion with an open end and an opposite closed end portion tapering toward a solid tip, said body being formed with an eyelet opening located inwardly of the solid tip and between two opposite sides of the tapering end portion, said tapering end portion being internally hollow to the solid tip and in the two sides adjacent said eyelet opening with the hollow continuing into the skirt portion.

3. An article suspension device comprising a unitary molded body having a hollow interior, an open portion at one end of the body and a tapered portion having a solid tip closing the other end of the body, and an eyelet formed in said tapered portion having an inner wall joined with said solid tip and dividing the interior of the tapered portion into a pair of hollow legs converging into the solid tip, said tapered portion being relatively flat and said eyelet forming an opening for article suspension purposes.

4. The device set forth in claim 3, wherein said molded body material is composed of a vinyl plastisol elastomer providing said body with an interior surface which has friction gripping properties and a smooth relatively scuff proof exterior surface.

References Cited by the Examiner

UNITED STATES PATENTS

| | | | |
|---|---|---|---|
| 60,779 | 1/67 | Patterson | 248—360 |
| 1,050,112 | 1/13 | Douglas | 248—360 |
| 2,100,985 | 11/37 | Smally | 18—34 |
| 2,212,049 | 8/40 | Ryland et al. | 248—359 |
| 2,294,661 | 9/42 | Hibbard | 24—73 |
| 2,946,093 | 7/60 | Everett | 18—36 |
| 2,966,701 | 1/61 | Heller | 18—34 |

FOREIGN PATENTS 735,884  9/32  France.

DONLEY J. STOCKING, Primary Examiner.

BOBBY R. GAY, Examiner.